United States Patent
Hashem et al.

(10) Patent No.: US 6,636,746 B1
(45) Date of Patent: Oct. 21, 2003

(54) METHOD AND APPARATUS IN A CDMA BASE STATION FOR CONTROLLING TRANSMIT POWER DURING SOFT HANDOFF

(75) Inventors: Bassam M. Hashem, Nepean (CA); Farideh Khaleghi, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/500,426

(22) Filed: Feb. 9, 2000

(51) Int. Cl.$^7$ ................................................ H04B 1/38
(52) U.S. Cl. ......................................... 455/522; 455/69
(58) Field of Search ........................ 455/69, 522, 442; 370/331

(56) References Cited

U.S. PATENT DOCUMENTS 5,924,043 A * 7/1999 Takano ....................... 370/335
6,317,587 B1 * 11/2001 Tiedemann et al. ......... 370/335
6,351,651 B1 * 2/2002 Hamabe et al. ............. 455/522

* cited by examiner

Primary Examiner—Nay Maung
Assistant Examiner—Tu X Nguyen

(57) ABSTRACT

In a CDMA cellular radio system during soft handoff the base stations interpret the conventional power control commands sent by the mobile station according to a majority vote thus reducing the probability of responding to an erroneous power control command. Alternatively, during soft handoff every other power control command received is deliberately ignored. The base stations also synchronize their power levels periodically resulting in more optimum base station power transmission levels, in turn resulting in a reduction in system noise and an increase in system capacity.

16 Claims, 5 Drawing Sheets

METHOD AND APPARATUS IN A CDMA BASE STATION FOR CONTROLLING TRANSMIT POWER DURING SOFT HANDOFF

FIELD OF THE INVENTION

This invention relates to CDMA cellular radio systems, and particularly to controlling the transmit power of base stations in a CDMA system when operating in soft handoff with respect to a mobile station.

BACKGROUND OF THE INVENTION

FIG. 1 depicts a portion of a conventional CDMA network operating in conjunction with the public switched telephone network (PSTN) 10. Connected to the PSTN 10 is a mobile telephone switching office (MTSO) 20. Connected to MTSO 20 is base station controller (BSC) 30, which in turn connects to base transceiver stations (BTS) 40 and BTS 50. BTS's 40 and 50 are equipped with antennas 45 and 55 respectively, which transmit and receive radio signals in an area between them and mobile stations (MS) 60. A forward link (47, 57) is defined as transmission from a BTS to a MS. A reverse link (46, 56) is defined as transmission from a MS to a BTS. The area serviced by a BTS comprises a cell.

Depending on a MS's position within a cell and on the terrestrial features in the vicinity, a MS is assumed to be in communication with one or more BTS's. In FIG. 1, MS 60 is assumed to be in communication with BTS's 40 and 50 both, over forward links 47 and 57 respectively, and over reverse links 46 and 56 respectively.

Forward link power control has two aspects: an open loop aspect and a closed loop aspect. The open loop aspect is used to compensate for the effect of distance variations and shadowing which are usually reciprocal on both links. The multipath fading conditions, however, are independent of the forward and reverse links, and so the mobile station has to tell the base station how to adjust its power to compensate fading. When the received energy-per-bit over noise density ($E_b/N_o$) from the base station is high (or low), the mobile station sends a power control command (PC) every power control group (also known as a slot) instructing the base station to decrease (or increase) its transmitted power. The power control command is sent at a fixed rate ($T_p$). Typical rates in third generation (3G) CDMA systems are 800 or 1500 power control commands per second.

A power control command is currently sent once during each "power control group"(A power control group is also referred to as a "slot"). The power control command may be a single bit (one state connoting increase and the other connoting decrease) or it may be a multibit command to allow changing the power by different steps.

Handoff procedures are employed for passing a mobile user from one base station to another. A mobile station is said to undergo a hard handoff if it disconnects its transmission with the current base station and initiates transmission with a new base station. If the mobile station can communicate simultaneously with two or more base stations it is said to be in soft handoff (SHO). Soft handoff is one of the advantages that CDMA cellular systems have over other cellular systems such as frequency-division multiple access (FDMA) since it provides diversity gain and reduces interference which enables the system to support more users. Mobile station 60 of FIG. 1 is in soft handoff, since it is in communication with two BTS's (40 and 50).

In the conventional scheme, the mobile station sends power control commands at the same rate (i.e. one command during each power control group) when it communicates with a single base station as it does when it is not in soft handoff, as depicted in FIG. 2. This is known as fast power control and is useful for tracking the changes in the communication channel due to multipath fading. A mobile station enters soft handoff when the signals received from at least two base stations are within a certain strength margin, and thus gain is achievable by combining signals (diversity gain). If the power levels of the signals are significantly different, the gain from diversity is lost. Also, if one base station starts transmitting at a high power compared to the power level of the other base station, interference is increased which reduces the system capacity. The base stations will keep transmitting at comparable power levels if the power control commands transmitted by the mobile station can be received without error.

In practice, however, error-free reception of the power control commands is unusual. The power commands are sent uncoded to avoid the delay associated with coding; hence, even when there is a good connection between the mobile station and the BTS, the error is about 5%. If the connection is weaker, the error rate can be significantly higher. Erroneous reception of the power control commands at the base stations can result in their transmitting at markedly different power levels. This results in a loss in the diversity gain that soft handoff can provide. It further can lead to increasing the interference ("noise floor") perceived by the other mobile stations which reduces the overall capacity of the CDMA system.

In conventional systems, the mobile station uses the same method to issue the power control commands when it is communicating with a single base station (i.e. not in soft handoff) and when it is communicating with more than one base station (i.e., in soft handoff). However, the two situations should be dealt with differently. When the mobile sends a single power control command to several base station, one or more of these base stations may receive this command in error. This results in that base station transmitting at a different power level than the other base stations. This results in a loss of diversity gain that we get from soft handoff and can also increase the interference in the system, which reduces the capacity.

One proposal that has been tried is to balance or synchronize the base stations every x frames by the base station controller 30. This is a slow process that needs the base stations to signal their transmit powers to the base station controller which then will decide what power levels all the base stations should use and signal this back to the base stations. Although this is beneficial, in addition to being slow this process does not address the main cause of the problem which is the power control commands being in error. Such a power synchronization technique is described in U.S. patent application Ser. No. 09/296,974 filed on Apr. 22, 1999 by Chheda et al, and assigned to the same assignee as the present application.

Another proposal suggested in U.S. patent application Ser. No. 09/352,299 filed on Dec. 7, 1999 by Hashem et al. spreads each power control command sent by the mobile station over a plurality of consecutive power control groups (time slots). Although this does alleviate the problem it requires changing the way in which the mobile issues the power control commands which is a standards issue.

SUMMARY OF THE INVENTION

The present invention comprises a method and apparatus in a base station for interpreting power control commands sent from the mobile station and received at the base stations while the mobile station is in soft handoff.

Instead of using every received power control command to cause a corresponding adjustment (increase or decrease) in transmit power, the present invention proposes that the number of adjustments be fewer than the number of power control commands sent by the mobile station and received by the base station.

According to one aspect, at least one command in every n consecutive commands is simply ignored. In the preferred embodiment n is 2 and one of the two commands is ignored which means that every other command is ignored.

According to another aspect, every n consecutive commands are interpreted by an algorithm that determines whether the n commands together should be considered an effective power control command. In the simplest case n would be 2 and the algorithm would operate to perform a simple majority vote to indicate an effective power increase command only if both consecutive commands are increase commands and an effective power decrease command only if both consecutive commands are decrease commands. It is not envisaged that n would extend much beyond 2 but n=3 could be feasible with an effective power control command being derived if at least two of the three consecutive received commands were of the same type (i.e. either increase or decrease).

The invention provides more error protection to the power control commands and reduces the rate at which base stations adjust their power. The invention also reduces the average transmission power and the deviation between the transmission powers of the base stations.

The invention will next be described in connection with exemplary embodiments; however, it should be clear to those skilled in the art that various modifications, additions and subtractions can be made without departing from the spirit or scope of the claims.

DETAILED DESCRIPTION OF THE PREFERRED EMBODIMENTS

Figure 1:
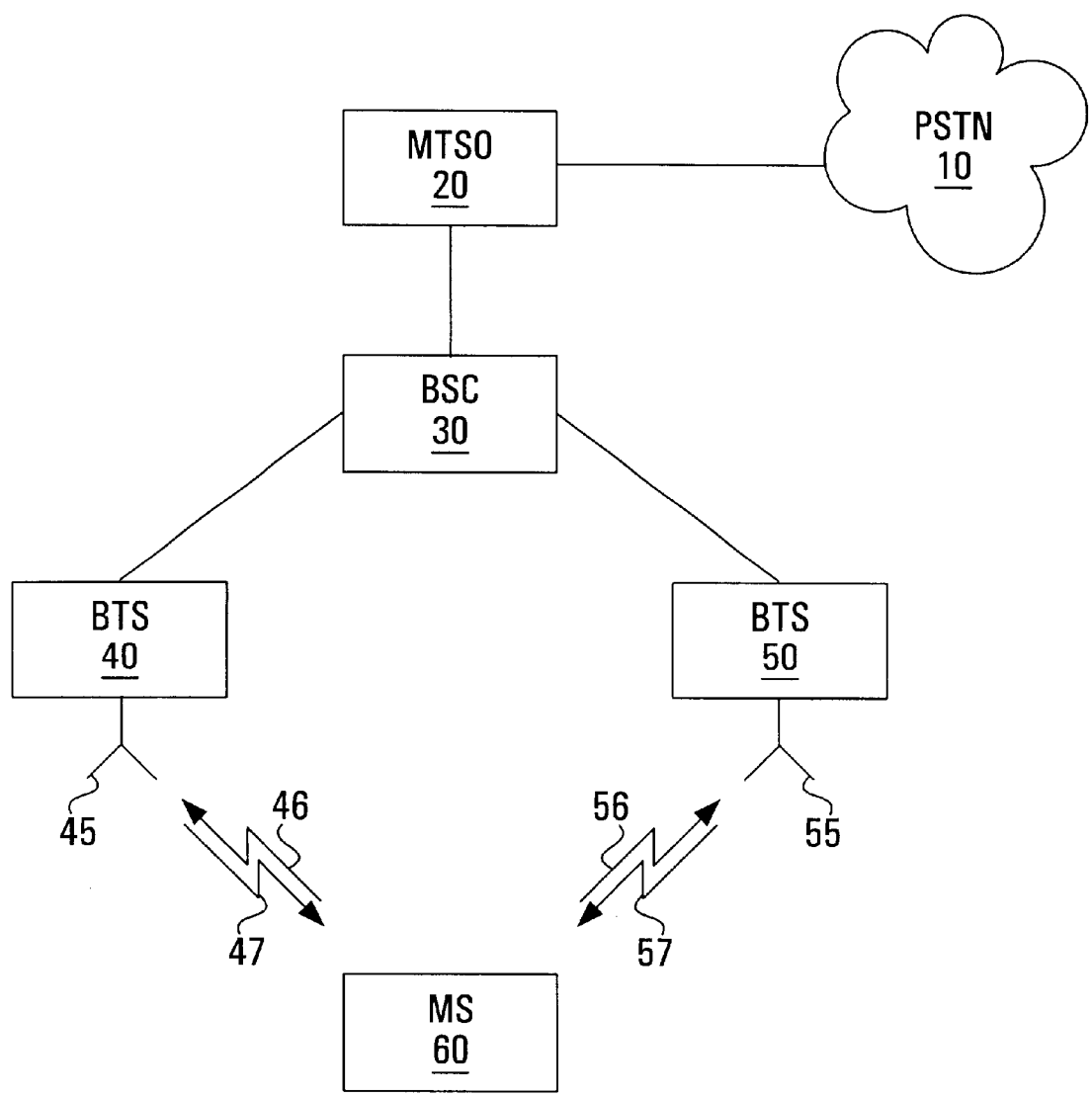
FIG. 1 is a high-level block diagram of a portion of a conventional CDMA cellular system with a mobile station in soft handoff.
Figure 2:
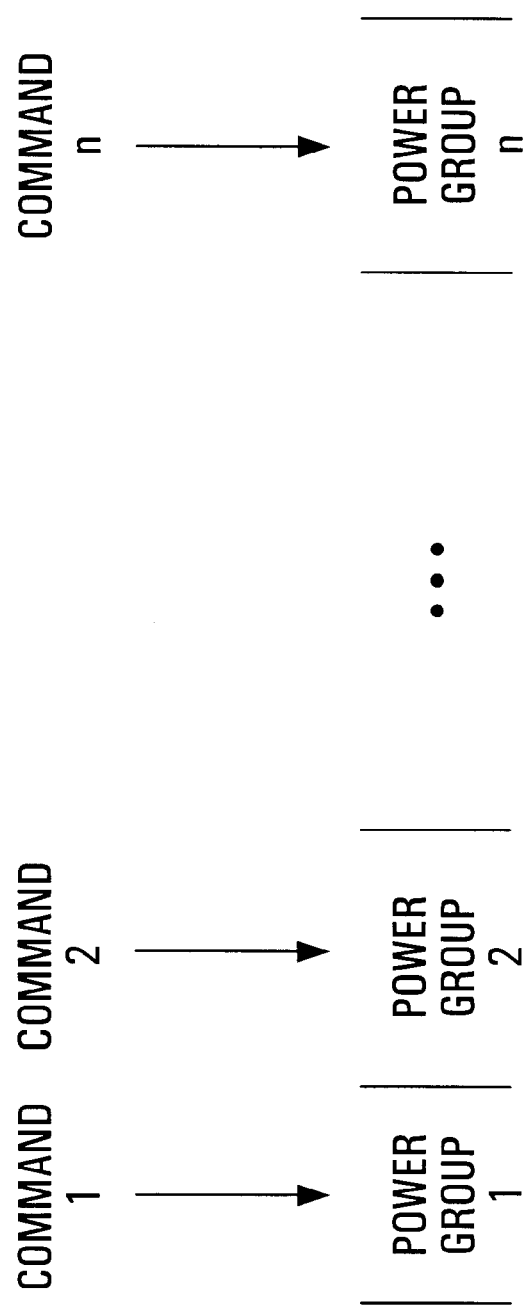
FIG. 2 illustrates a conventional method of sending power control commands from a mobile station in a CDMA cellular system.

The present invention is applicable to a CDMA network as depicted in FIG. 1 and uses mobile stations 60 which send, in conventional fashion, power control commands at a rate of one command during each power control group irrespective of whether a particular mobile station is or is not in soft handoff exactly as depicted in FIG. 2. However, the base stations 60, 50 are, according to the invention, modified such that during soft handoff they do not act to increase or decrease base station power in response to one power control command at a time. Instead, according to one embodiment of the invention, during soft handoff for every predetermined plurality, n of power control commands received by a base station during n respective consecutive control groups one command is simply ignored. The preferred value for n is 2 so that every other command is ignored.

Figure 3:
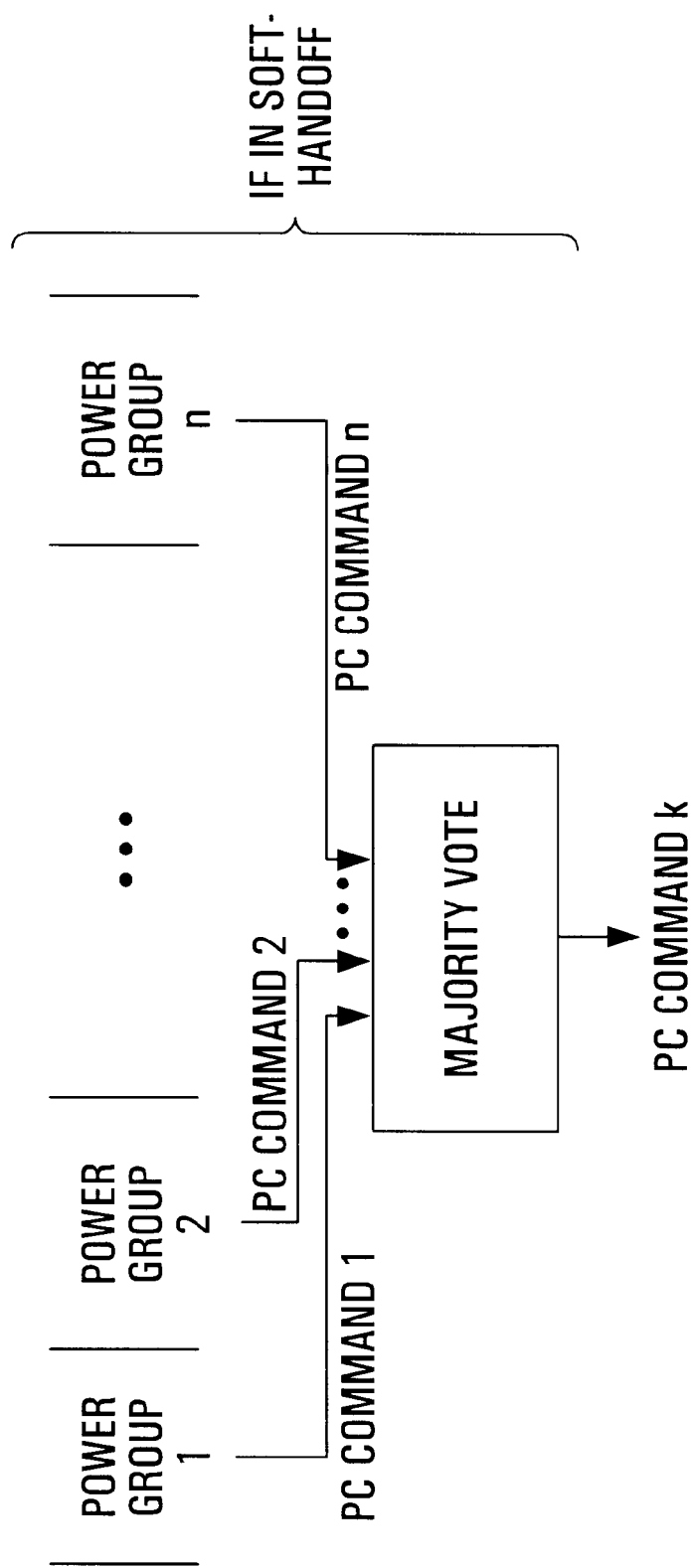
FIG. 3 illustrates the method of the present invention of interpreting power control commands from a mobile station in a CDMA cellular system.

In an alternative embodiment as depicted in FIG. 3, during soft handoff every n power control commands received by a base station during n respective consecutive control groups is subjected to a majority vote algorithm which determines whether there is a majority ($>n/2$) of first type (increase) or second type (decrease) power control commands among the n power control commands. If there is a first type majority, this is interpreted as an effective power increase command k, if there is a second type majority this is interpreted as an effective power decrease command k and if there is no majority this is interpreted as no command. The base station power is then adjusted according to the effective command k.

It is noted that the algorithm embodying the invention may be implemented in a microprocessor, ASIC (application specific integrated circuit) or the like contained in each base station.

Alternatively, in the case where every other command is ignored, this may be achieved by using a standard microprocessor in the base station and "tricking" the microprocessor into operating in Mode 0 instead of Mode 1. In Mode 0 the power control commands are sampled at half the frequency they would be in Mode 1 and this has the effect of ignoring every other command. Whether the microprocessor operates in Mode 0 or Mode 1 is determined by a control signal form the BSC 30.

It is noted also that the BSC 30 instructs each base station whether or not it is in soft handoff so that, in soft handoff, it will employ the inventive technique for interpreting the received commands rather than controlling the power on the basis of a single received command when the base station is in normal (non-handoff) operation.

Figure 4:
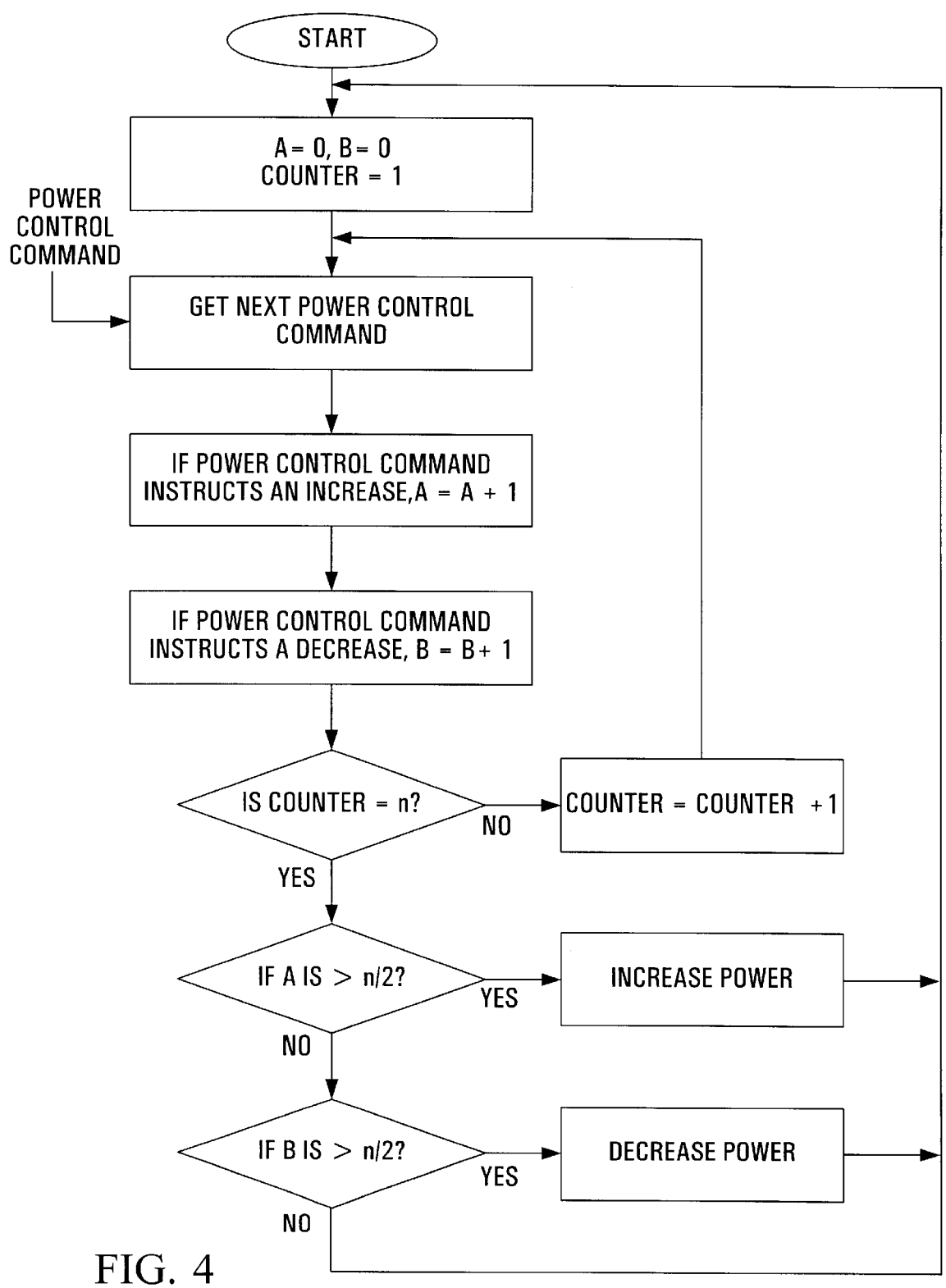
FIG. 4 is a flow diagram of the method of the present invention.

The majority vote algorithm used in the present invention may be expressed as a flowchart depicted in FIG. 4.

Figure 5:
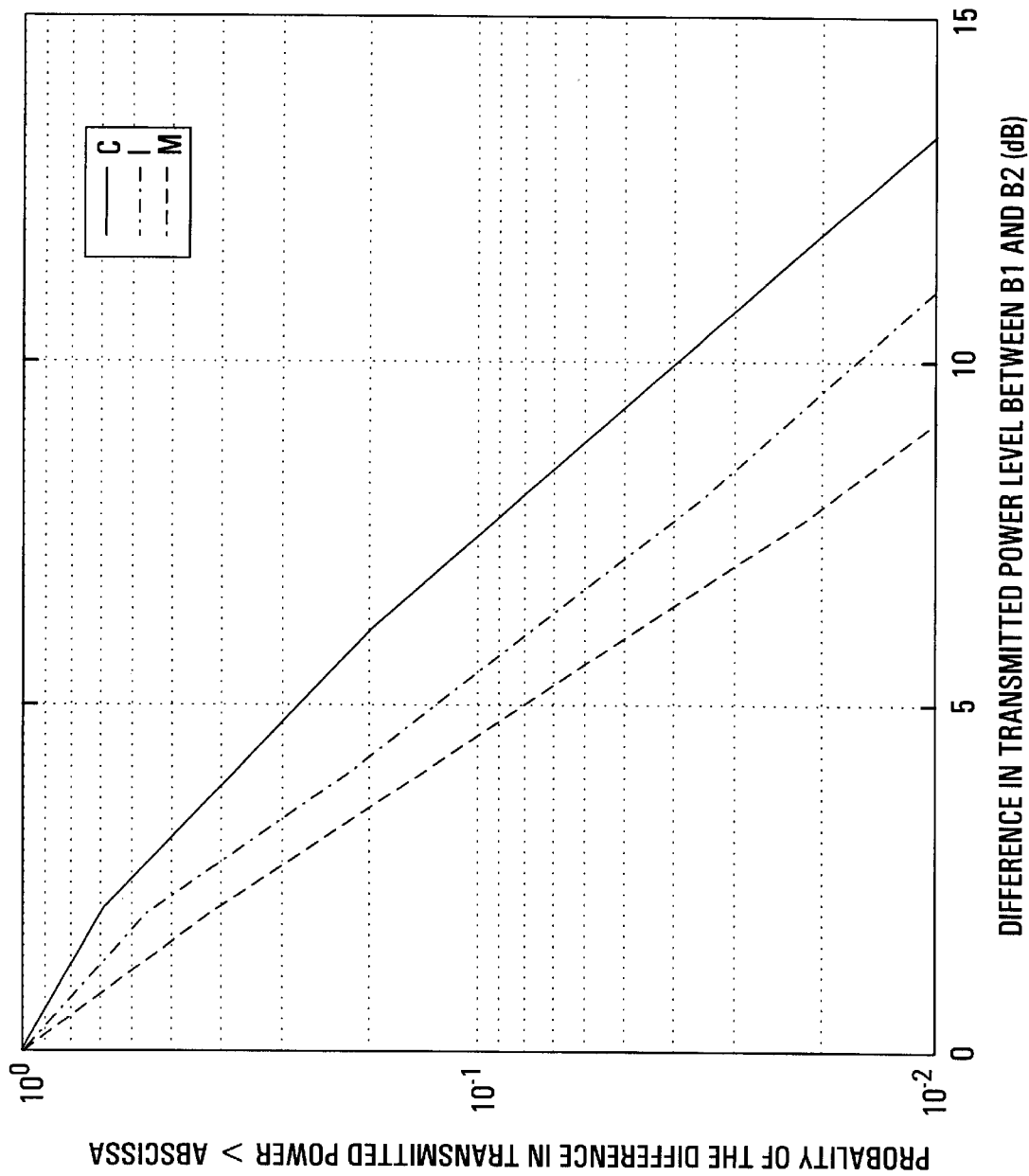
FIG. 5 plots the performance of the present invention against the conventional method.

The performance of the invention is illustrated in FIG. 5 which is based on simulation results and shows the invention in comparison with the conventional method of adjusting base station transmit power.

The simulation assumptions are:

The mobile is in SHO with two base stations. The path loss difference (not including the multipath fading) between the two base stations and the mobile is 2 dB.

The multipath fading channel is a two Raleigh paths fading channel.

Power control is employed on both forward and reverse links. This includes both the inner loop and the outer loop algorithm.

The step size for the inner loop power control is 1 dB.

The up step for the outer loop is 0.5 dB while the down step is 0.5/99.

The error rate on the power control commands is not fixed but rather is a function of the link quality.

The desired FER (frame error rate) on both the downlink and the uplink is 1%.

The two base stations transmitted powers are synchronized every 2 frames based on the reverse link quality.

The power to compensate for multipath fading (closed loop) is limited to ±12 dB.

Assuming base station 40 (FIG. 1) transmitted power to be x and base station 50 transmitted power to be y, we define z to be $|x-y|$.

The performance is evaluated in terms of the statistics of the difference z in the two transmitted powers and in terms of the average transmitted powers by the two base stations.

The performance of the invention was examined under different velocities. The simulated cases were:
C: Conventional method; base stations powers are adjusted every power control command.
M: Majority voting on two consecutive power control commands.
I: Every other command ignored.

Table 1 shows the statistics of x and y (not in dB).

TABLE 1

Statistics of the cells transmitted powers
(Synchronisation is done every 2 frames)

| Speed (Km/h) | Command repetition | Avg (x) | Var (x) | Avg (y) | Var (y) |
|---|---|---|---|---|---|
| 5 | C | 7.02 | 56.32 | 7.74 | 94.69 |
| 5 | I | 7.23 | 43.8 | 7.68 | 56.6 |
| 5 | M | 6.98 | 33.62 | 7.32 | 41.71 |
| 25 | C | 6.59 | 25.76 | 6.74 | 32.33 |
| 25 | I | 6.46 | 14.6 | 6.31 | 16.35 |
| 25 | M | 6.24 | 11.4 | 6.00 | 10.95 |
| 50 | C | 6.11 | 15.96 | 6.15 | 21.34 |
| 50 | I | 5.98 | 9.91 | 5.96 | 12.03 |
| 50 | M | 5.74 | 7.40 | 5.66 | 7.97 |

FIG. 5 shows the complementary cumulative distribution of z for the above mentioned cases at a mobile station speed of 5 km/h. It can be seen that a considerable reduction in the deviation in the transmitted powers is obtained by applying the present invention.

In conclusion it is noted that SHO algorithm is one of the critical components that determine the performance of a CDMA system. When a mixture of both the voice and data users are to be supported, the importance of an intelligent and simple SHO algorithm is even more accentuated. Reducing the deviation in the base stations transmitted powers helps to achieve the desired diversity gain from SHO. From the simulation results we see that at a speed of 5 km/h, the probability that the difference in the two base stations transmitted powers being greater than 5 dB is about 25% using the conventional scheme while it is only about 15% when every other command is ignored and only 8% for majority voting over two commands. We notice also that the base stations' average transmitted power is reduced by employing the invention, particularly in the case of the majority voting scheme. We should notice also that this gain is achieved with fast synchronization (2 frames). If the synchronization is slower, the gain will be larger.

Although the invention is quite distinct from power synchronization techniques such as that described in above mentioned U.S. patent application 09/296,974 to Chheda et al. in practice power synchronization would usually be carried out together with the inventive technique to enhance the operation. This application in its entirety is hereby incorporated by reference into this document.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

What is claimed is:

1. In a CDMA cellular radio system in which a mobile station sends during power control groups respective power control commands of a first type to instruct an increase of base station transmit power and of a second type to instruct a decrease of base station transmit power, a method of controlling the transmit power of a base station during soft handoff with a mobile station, the method comprising in the base station:
receiving the power control commands transmitted by the mobile station;
ignoring one in every n consecutive power control commands received; and
carrying out adjustments in the transmit power in response to the non-ignored power control commands received.

2. A method according to claim 1 where n is 2.

3. A method according to claim 2, wherein each power control command is a single bit.

4. In a CDMA cellular radio system in which a mobile station sends during power control groups respective power control commands of a first type to instruct an increase of base station transmit power and of a second type to instruct a decrease of base station transmit power, a method of controlling the transmit power of a base station during soft handoff with a mobile station, the method comprising in the base station:
receiving the power control commands transmitted by the mobile station;
interpreting every n consecutive power control commands received to determine a single effective power control command; and
adjusting the transmit power according to the effective power control command,
wherein the step of interpreting derives an effective power control command of the first type only if a majority of the n consecutive power control commands are of the first type and derives an effective power control command of the second type only if a majority of the n consecutive power control commands are of the second type.

5. A method according to claim 4, wherein n is 2.

6. A method according to claim 5, wherein each power control command is a single bit.

7. Apparatus for controlling the transmit power of a CDMA base station during soft handoff with a mobile station which sends during power control groups respective power control commands of a first type to instruct an increase of base station transmit power and of a second type to instruct a decrease of base station transmit power, the apparatus comprising:
receiving means for receiving the power control commands transmitted by the mobile station;
adjusting means for carrying out adjustments in the transmitted power in response to the power control commands received; and
means for preventing one in every n consecutive power control commands received from reaching the adjustment means, such that the numbers of adjustments made is less than the number of power control commands received.

8. Apparatus according to claim 7, wherein n is 2.

9. Apparatus according to claim 8, wherein each power control command is a single bit.

10. Apparatus for controlling the transmit power of a CDMA base station during soft handoff with a mobile station which sends during power control groups respective power control commands of a first type to instruct an increase of base station transmit power and of a second type to instruct a decrease of base station transmit power, the apparatus comprising:

receiving means for receiving the power control commands transmitted by the mobile station;

adjusting means for carrying out adjustments in the transmitted power in response to executive power control commands; and interpreting means, connected between the receiving means and the adjusting means, the interpreting means being arranged to interpret every n consecutive power control commands to determine a single effective power control command;

wherein the interpreting means is arranged to derive an effective power control command of the first type only if a majority of the n consecutive power control commands is of the first type and to derive an effective power control command of the second type only if a majority of the n consecutive power control commands is of the second type.

11. Apparatus according to claim 10, wherein n is 2.

12. Apparatus according to claim 11, wherein each power control command is a single bit.

13. A base station for a CDMA cellular radio system, the base station comprising:

receive means for receiving power control commands transmitted by a mobile station; and adjust means for carrying out adjustments in the base station transmit power in response to the power control commands received by the receive means; and means operating when the base station is in soft-handoff mode for preventing one in every n consecutive power control commands from reaching the adjust means, such that the numbers of adjustments carried out is less than the number of power control commands received;

wherein when the base station is in normal operating (non-handoff) mode, the number of adjustments carried out corresponds exactly to the number of power control commands received and when the base station is in soft-handoff mode, the number of adjustments carried out is less that the number of power control commands received.

14. A base station according to claim 13, wherein n is 2.

15. A base station for a CDMA cellular radio system, the base station comprising:

receive means for receiving power control commands transmitted by a mobile station; and adjust means for carrying out adjustments in the base station transmit power in response to effective power control commands;

interpret means connected between the receive and the adjust means, the interpret means operating when the base station is in soft handoff and being arranged to derive from every n consecutive power control commands a single effective power control command, wherein the interpret means is arranged to derive an effective power control command of the first type only if a majority of the n consecutive power control commands is of the first type and to derive an effective power control command of the second type only if a majority of the n consecutive power control commands is of the second type;

wherein the adjust means is arranged, when the base station is in soft handoff, to operate in response to the effective power control command, such that the number of adjustments carried out is less than the number of power control commands received;

and when the base station is in normal operating (non-handoff) mode, the number of adjustments carried out corresponds exactly to the number commands received and when the base station is in soft-handoff mode.

16. A base station according to claim 15, wherein n is 2.

* * * * *